(12) United States Patent
Kada

(10) Patent No.: US 6,871,717 B2
(45) Date of Patent: Mar. 29, 2005

(54) VEHICLE STEERING SYSTEM

(75) Inventor: Tomoyasu Kada, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 89 days.

(21) Appl. No.: 10/602,774

(22) Filed: Jun. 25, 2003

(65) Prior Publication Data

US 2004/0055801 A1 Mar. 25, 2004

(30) Foreign Application Priority Data

Jun. 27, 2002 (JP) .................................... P2002-187227

(51) Int. Cl.[7] .............................................. B60T 7/16
(52) U.S. Cl. ...................... 180/167; 180/168; 701/301
(58) Field of Search ................. 180/167, 168, 180/169, 197, 446, 445; 701/41, 37, 48, 23, 10, 301

(56) References Cited

U.S. PATENT DOCUMENTS

| | | | | |
|---|---|---|---|---|
| 4,800,974 A | * | 1/1989 | Wand et al. .................. | 701/41 |
| 5,261,503 A | * | 11/1993 | Yasui ......................... | 180/197 |
| 5,373,911 A | * | 12/1994 | Yasui ......................... | 180/168 |
| 6,013,994 A | * | 1/2000 | Endo et al. .................... | 701/41 |
| 6,144,908 A | * | 11/2000 | Yasuda ........................ | 701/41 |
| 6,359,553 B1 | * | 3/2002 | Kopischke ................... | 180/169 |
| 6,397,134 B1 | * | 5/2002 | Shal et al. .................... | 701/37 |
| 6,445,984 B1 | * | 9/2002 | Kellogg ....................... | 701/23 |
| 6,574,560 B2 | * | 6/2003 | Abe et al. .................... | 701/301 |

FOREIGN PATENT DOCUMENTS

JP 2000-168442 6/2000

* cited by examiner

Primary Examiner—Christopher P. Ellis
Assistant Examiner—Hau Phan
(74) Attorney, Agent, or Firm—McGinn & Gibb, PLLC

(57) ABSTRACT

A steering control unit (3) employs the detected results of environmental conditions given by an environmental-condition detecting unit (5) and issues an operating command to a steering motor ($M_1$) attached to a steering mechanism (1) as a steering actuator when, for example, an object approaching from behind at a speed exceeding a predetermined speed is detected and when the steering control unit (3) decides there is the possibility that the object may collide with one's own vehicle. Then the steering control unit (3) causes the steering motor ($M_1$) to make the steering mechanism (1) perform forcible steering in order to avoid danger.

4 Claims, 3 Drawing Sheets

VEHICLE STEERING SYSTEM

BACKGROUND OF THE INVENTION

The present invention relates to a vehicle steering system for guiding a vehicle in response to the operation of a steering unit such as a steering wheel performed by a driver and more particularly to a vehicle steering system capable of forcible steering in order to avoid danger in accordance with the environmental condition.

Automobiles (vehicles) in recent years are equipped with various kinds of safety devices for reducing driving loads and preventing dangers from happening during the travel of vehicles. In a vehicle disclosed in JP-A-2000-168442, for example, an imaging device covers a rearward imaging visual field and the detection of environmental conditions of one's own vehicle is based on the results of processing the images picked up by the imaging device, whereby the detected results are used to issue or express a predetermined warning.

However, inexperience drivers in particular tend to confine their attention to the forward side. As driving is normally done on any road with other vehicles running both in front and rear and side by side, the drivers are needed to pay attention forward and backward and also sideways. The vehicle disclosed in JP-A-2000-168442 above is designed to prevent dangers from happening when the following vehicle rapidly approaching behind one's own vehicle by informing its driver of environmental conditions in the rear and on both lateral sides of the vehicle, to which sides attention may be hardly directed.

With such an arrangement that a warning is issued or expressed in response to the detection of the environmental conditions as described above, there develops a problem arising from the fact that the proper action of steering for preventing dangers from happening is not taken in response to the detection thereof. In the case of inexperienced drivers in particular, it is even feared that sudden driving operation in response to a warning, for example, wheeling a vehicle almost without thinking may newly cause a danger.

The problem above may be settled by making a warning a voice message on the basis of the detected results of the environmental conditions and providing information on the kinds of environmental conditions such as the approach of the following vehicle and deviation from a vehicle lane including proper driving technique. However, the problem in this case is that the system tends to become complicated because the arrangement above makes it necessary to issue different voice messages depending on the situation by distinguishing among numerous environmental conditions brought about during the travel of one's own vehicle.

SUMMARY OF THE INVENTION

An object of the invention made in view of foregoing circumstances is to provide a vehicle steering system for taking proper steps to ensure that dangers are avoided by utilizing the detected results of environmental conditions during the travel of a vehicle using a detection unit mounted in the vehicle for controlling a steering actuator attached to the vehicle and also forcing the steering actuator to operate on the basis of the detected results.

In order to solve the aforesaid object, the invention is characterized by having the following arrangement.
Aspect 1. A vehicle steering system installed in a vehicle comprising:

an environmental-condition detecting unit which detects environmental-condition in a rear and on both sides of the vehicle at least;

a steering actuator which operates in response to an operation of a steering unit for steering and applying steering force to a steering mechanism;

a decision unit which decides whether an object approaching the vehicle from behind exists and whether the action of steering toward the side of the vehicle can be taken on the basis of the results detected by the environmental-condition detecting unit; and a control unit which forces the steering actuator to operate on the basis of the result decided by the decision unit irrespective of the operation of the steering unit.
Aspect 2. The vehicle steering system according to the aspect 1, wherein the control unit makes the steering actuator perform a forcible steering operation to one side decided to be appropriate by the decision unit when the decision unit decides that an object is approaching the vehicle from behind at a speed exceeding a predetermined relative speed.
Aspect 3. The vehicle steering system according to the aspect 1, further comprising an alarm device for issuing a predetermined warning according to the operating command given by the control unit before the steering actuator performs the forcible steering operation.
Aspect 4. The vehicle steering system according to the aspect 3, wherein the control unit decides whether a driver takes an avoidance steering during a predetermined period from when the predetermined warning is issued, and
wherein when the control unit decides that the driver does not take the avoidance steering during the predetermined time, the control unit forces the steering actuator to operate.

DETAILED DESCRIPTION OF PREFERRED EMBODIMENTS

Figure 1:
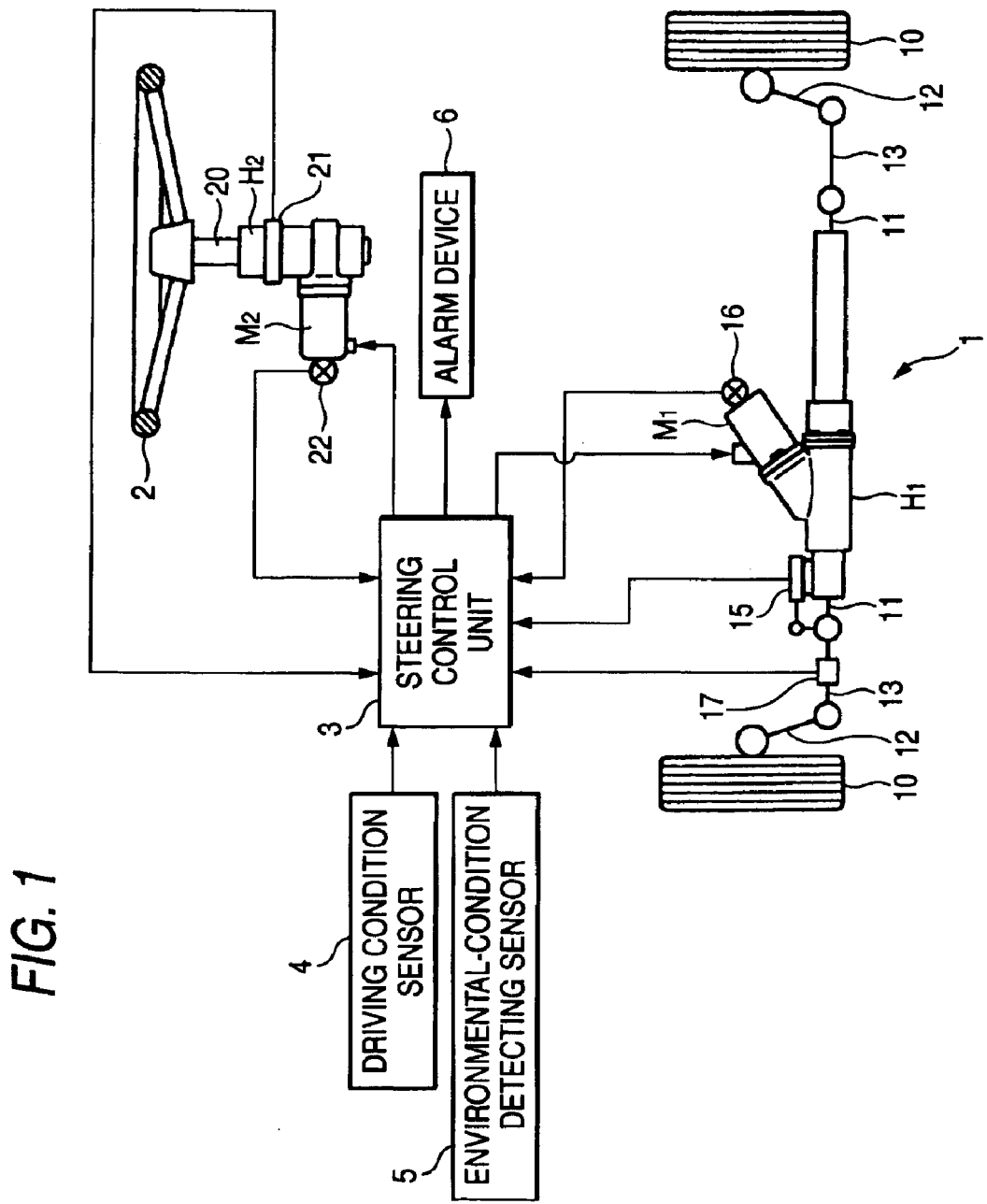
FIG. 1 is a block diagram showing the overall construction of a vehicle steering system.

An embodiment of the invention will now be described with reference to the drawings. FIG. 1 is a block diagram showing the overall construction of a vehicle steering system.

The steering system is formed as a separate type steering system or a so-called steer-by-wire type steering system constituted by a steering mechanism 1 for steering a pair of course adjusting wheels 10 and 10 disposed on either side of a vehicle body, a steering wheel (a steering unit) 2 disposed such that it is mechanically separated from the steering mechanism 1 and a steering control unit 3 for controlling the action of steering, which will be described later, so as to operate the steering mechanism 1 in concert with the operation of the steering wheel 2 and to apply steering reaction force to the steering wheel 2.

The steering mechanism 1 is arranged such that both end portions of a steering shaft 11 provided in an extended condition across the vehicle body (not shown) are made axially movable in the length direction of the steering shaft 11 coupled to the respective knuckle arms 12 and 12 of the wheels 10 and 10 via tie-rods 13 and 13 so as to steer the wheels 10 and 10 to the right and left when the steering shaft 11 is moved in both directions to push and pull the knuckle arms 12 and 12 via the tie-rods 13 and 13.

The steering shaft 11 is supported axially movably in its length direction inside a cylindrical rack housing H1 and a steering motor M1 as a steering actuator is mounted on the outer side of the mid-portion of the rack housing H1. The output shaft of the steering motor M1 is provided in an extended condition within the rack housing H1 and geared to the mid-portion of the steering shaft 11 via a proper motion conversion mechanism such as a ball screw mechanism. The revolution of the steering motor M1 is converted by the motion conversion mechanism into an axial movement in the length direction of the steering shaft 11, whereby the steering is done in response to the movement of the steering shaft 11.

The steering motor M1 is driven under control according to the operating command given by the steering control unit 3 to a drive circuit (not shown). The actual steering angle of the wheels 10 and 10 that are steered in response to the driving of the steering motor M1 is detected by an actual steering angle sensor 15 so arranged as to detect the displacement of the coupling portion where the steering shaft 11 is coupled to the tie-rod 13 on one side and given to the steering control unit 3. For example, The actual steering angle sensor 15 as shown in a rough sketch of FIG. 1 may be arranged so as to detect the movement of a detection cylinder interposed between the coupling portion and the outside of the rack housing H1.

An rotation angle sensor 16 for detecting these angles of rotation is attached to the steering motor $M_1$. The output of the rotation angle sensor 16 is given to the steering control unit 3 and used to adjust the phase of driving current of the steering motor $M_1$ and also used as a substitute for calculating the actual steering angle when the actual steering angle sensor 15 fails. The rotation angle sensor 16 may be formed with a known resolver, for example.

A tie-rod axial force sensor 17 for detecting axial force acting on one of the tie-rods 13 and 13 is attached to the tie-rod 13. The output of the tie-rod axial force sensor 17 is given to the steering control unit 3 and used as a detected value of the steering reaction force actually applied to the wheels 10 and 10 accompanied by the action of steering. The tie-rod axial force sensor 17 may be arranged so that the tie-rod 13 is stuck with a strain gauge on its surface, for example, whereby to detect the strain produced on the tie-rod 13 because of the action of the steering reaction force.

On the other hand, the steering wheel 2 as a steering unit is supported with a proper portion of the vehicle body (not shown) via a column housing H2 for rotatably holding a column shaft 20 for use as a rotating shaft. A reaction motor M2 is mounted on the outer side of the column housing H2 and the output shaft of the reaction motor M2 is provided in an extended condition within and in a manner intersecting the column housing H2 and geared to the column shaft 20 via proper reduction gears such as worm gears.

With the arrangement above, the torque of the reaction motor M2 transmitted to the column shaft 20 while the reduction gears are used for speed reduction is applied as reaction force directed opposite to the operating direction to the column shaft 20 and the steering wheel 2 mounted at the upper end of the column shaft 20. The reaction motor M2 is driven according to the operating command transmitted from the steering control unit 3 to the drive circuit (not shown) The driving of the reaction motor M2 is intended to make the driver experience a bodily sensation of operability by spuriously applying to the steering wheel 2 the steering reaction force actually applied to the wheels 10 and 10 accompanied by the action of steering.

The steering angle of the steering wheel 2 operated against the applied reaction force is detected by a steering angle sensor 21 installed in the mid-portion of the column shaft 20 and the detected result is given to the steering control unit 3. A potentiometer that varies the output with displacement from the position of the median of a steering angle may be used as the steering angle sensor 21, for example. The output of an rotation angle sensor 22 attached to the reaction motor M2 is given to the steering control unit 3. This output is used for phase adjustment of the driving current of the reaction motor M2 and also alternatively used for the calculation of the steering angle at the time the steering angle sensor 21 fails. Like the rotation angle sensor 16 attached to the steering motor M1, the rotation angle sensor 22 may be formed with a known resolver.

To the steering control unit 3, the steering condition actually produced by the operation of the steering mechanism 1 is given as input from the actual steering angle sensor 15, the rotation angle sensor 16 and the tie-rod axial force sensor 17, and the operating condition of the steering wheel 2 as a steering unit is given as input from the steering angle sensor 21 and the rotation angle sensor 22. To the steering control unit 3, further, signals indicative of the driving condition of a vehicle, including a vehicle speed, a yaw rate, a lateral acceleration and so on are given by a driving condition sensor 4 installed in various portions of the vehicle; moreover, the detected results of the environmental conditions of the vehicle including the rear side, the right and left sides are given by an environmental-condition detecting unit 5.

On the other hand, the output of the steering control unit 3 is as described above given to the steering motor M1 for making the steering mechanism 1 perform the action of steering and to the reaction motor M2 for giving the reaction force to the steering wheel 2. The steering control unit 3 equipped with CPU, ROM and RAM performs steering control operation intended-for the steering motor M1 as well as reaction force control operation intended for the reaction motor M2.

The steering control operation of the steering control unit 3 is performed through the steps of, for example, obtaining a target steering angle by multiplying the operating angle of the steering wheel 2 detected by the steering angle sensor 21 and a predetermined control gain together and giving the operating command to the steering motor M1 under feedback control based on the deviation of the target angle from the actual steering angle of the lateral wheels 10 and 10 detected by the actual steering angle sensor 15. The torque of the steering motor M1 in response to the steering control operation is transmitted to the steering shaft 11 and the steering shaft 11 is axially moved in its length direction, so that the action of steering is performed in response to the operation of the steering wheel 2.

The driving condition detected by the driving condition sensor 4 is used to select the control gain. The control gain is set, for example, as a value that decreases as the vehicle speed increases and also as a value that decreases as the turning degree of the vehicle determined by the yaw rate and the lateral acceleration increases. Consequently, the target steering angle becomes smaller during the high-speed driving and becomes greater during the low-speed driving and moreover becomes smaller as a sharp turn is taken during the turning. Thus steering characteristics corresponding to the driving condition is obtained by controlling the steering motor M1 on the basis of the target steering angle.

The reaction force control operation of the steering control unit 3 is performed through the steps of, for example, obtaining the actual reaction force applied to the steering mechanism 1 on the basis of input from the tie-rod axial force sensor 17, calculating a target reaction force to be added to the steering wheel 2 by multiplying the actual reaction force thus obtained and the predetermined control gain together and giving the operating command to the reaction motor M2 in response to the target reaction force.

The driving condition detected by the driving condition sensor 4 at this time is used to correct the control gain. This correction is made by, for example, setting greater the control gain as the vehicle speed and the turning degree become greater and by setting greater the control gain as the reduction degree obtained by the front and rear acceleration becomes greater. With the operations above, the torque of the reaction motor M2 applied to the column shaft 20 is applied to the steering wheel 2 as steering reaction force. The steering reaction force is what results from correcting the actual reaction force applied to the steering mechanism 1 in accordance with the driving condition, so that the driver who operates the steering wheel 2 experiences a bodily sensation of excellent operability.

Figure 2:
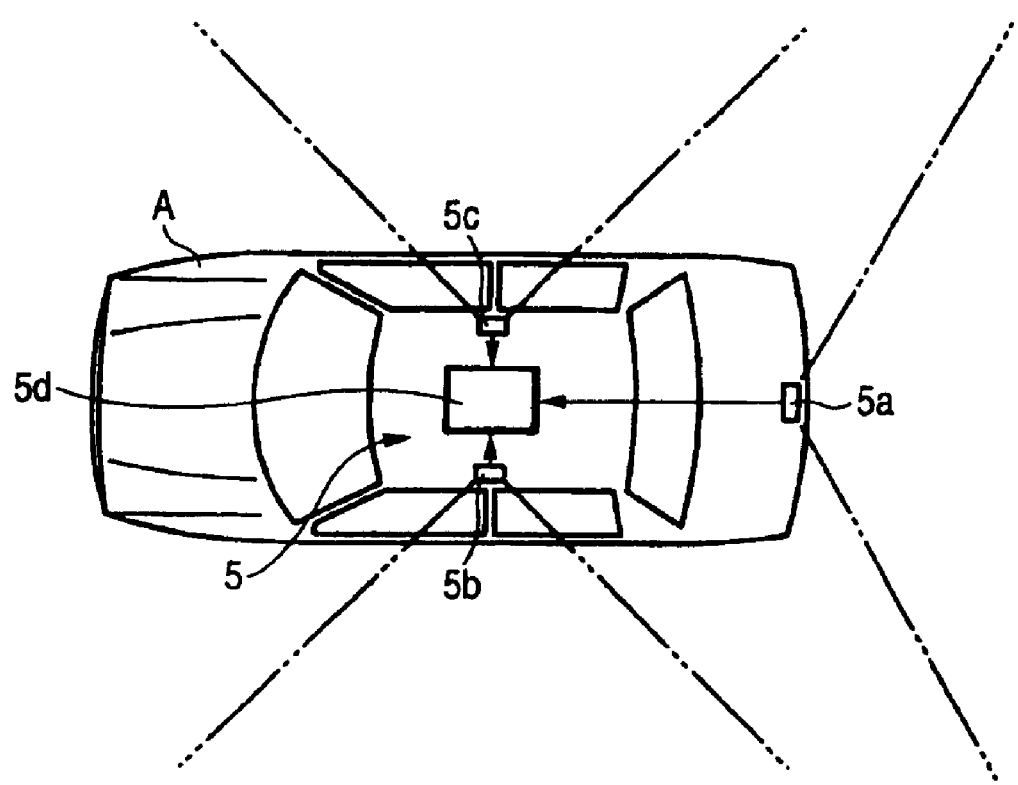
FIG. 2 is a plan view of a vehicle having an environmental-condition detecting unit.

Further, the steering control unit 3 employs the detected results of the environmental conditions given by the environmental-condition detecting unit 5 during the time the steering control operation is put into practice for performing the following characteristic operations. The environmental-condition detecting unit 5 is used to detect the environmental conditions of the vehicle including the rear side, the right and left sides and as shown in FIG. 2, provided with imaging devices 5a, 5b and 5c mounted on a vehicle A with the rear side and the right and left sides as those within an imaging visual field and an image processing unit 5d for processing images picked up by the imaging devices.

Figure 3:
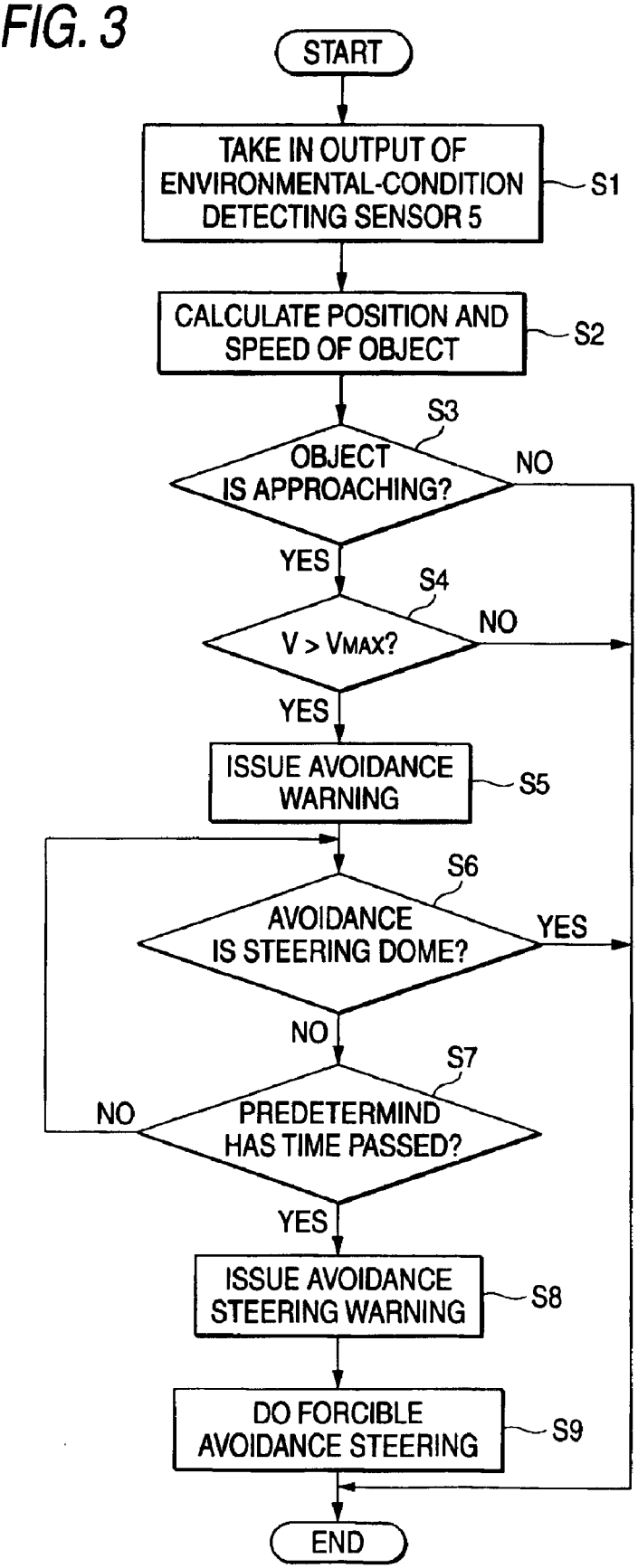
FIG. 3 is a flowchart showing the contents of an avoidance control operation performed by the steering control unit.

FIG. 3 is a flowchart showing the contents of an avoidance control operation performed by the steering control unit 3. The action shown in FIG. 3 is what is performed as interrupt processing in a predetermined cycle after the steering control unit 3 starts operating in response to the on-operation of a key switch and the steering control unit 3 takes in the output of the environmental-condition detecting unit 5 (Step 1).

The environmental-condition detecting unit 5 is arranged so as to subject images sequentially photographed by the imaging devices 5a, 5b and 5c in the image processing unit 5d to image processing whereby to output image data extracted from objects (e.g. other vehicles, guard rails, lanes, obstacles, etc.) existing in the rear, the right and left of one's own vehicle A. Then the steering control unit 3 that has taken in the image data calculates the positions and speeds of the objects thus extracted (Step 2).

At Step 2, the kind of the pertinent object contained in the image data is recognized by, for example, pattern matching first and compared with the result of recognition similarly made with respect to image data of the past so as to obtain relative position and the relative speed of each object to the automobile A. The calculation of the relative speed is made by correcting the absolute speed of the object obtained from a comparison of data by using the driving conditions of the automobile A (e.g., vehicle speed, turning direction, turning degree and so forth) transmitted from the driving condition sensor 4. This procedure is disclosed in JP-A-2000-168442 and so on.

After completing the calculation of the position and speed mentioned above, the steering control unit 3 decides whether there is an object approaching from behind the automobile A (Step 3) and when the steering control unit 3 decides that there exists such an approaching object, the steering control unit 3 compares the relative speed V of the approaching object with a preset upper-limit speed $V_{max}$ (Step 4).

The decision on the presence or absence of the approaching object at Step 3 is made by examining the position and speed of the pertinent object calculated at Step 2, deciding whether the object is a solid or a moving object and then finding out the moving direction of the object so as to extract the moving object whose course is so directed as to approach the automobile A. Moreover, the upper-limit speed $V_{max}$ for use in comparing speeds as described above is set with the possibility, as a reference, that the object (mainly another vehicle) approaching from behind may collide with the automobile A in case where the approaching speed of the former is kept at a level exceeding the upper-limit speed $V_{max}$.

When it is decided at Step 3 that no approaching object exists and when it is decided at Step 4 that the relative speed V of the approaching object is equal to or lower than the upper-limit speed $V_{max}$, the steering control unit 3 decides that there is no danger of collision for the moment and terminates a series of operations without performing the avoidance control operation that follows and then waits for the next chance of performing the control functions. When it is decided that an object approaching at the upper-limit speed $V_{max}$ exists at Step 4, the steering control unit 3 may issue the operating command to an alarm device 6 so as to issue a warning with an unassertive warning sound or a voice message whereby to call the attention of the driver.

When the relative speed V of the approaching object is found to be in excess of the upper-limit speed $V_{max}$ as a result of comparison, on the other hand, the steering control unit 3 decides that the danger of collision exists and issues the operating command to the alarm device 6 first. Then the steering control unit 3 makes the alarm device 6 issue an avoidance warning in order to urge the driver to do avoidance steering (Step 5) and checks whether the avoidance steering has actually been done before the predetermined passage of time (Steps 6 and 7).

The avoidance warning can be issued with a strong warning sound or an emphatic voice message to inform the driver of the possibility of collision. A voice message to be adopted preferably includes suggesting the direction of avoidance steering by stating, for example, 'The following vehicle is rapidly approaching. Move to the left (or right) lane.' In this case, by using the calculated results of the position and speed of the object at Step 2, the avoidance steering is directed to any side as designated to be free from obstacles out of both lateral sides of ones own vehicle A.

The decision on the presence or absence of the avoidance steering at Step 6 can be made by monitoring the changing condition of input from the steering angle sensor 21 or the actual steering angle sensor 15 in terms of time. When it is decided that the avoidance steering has been done before the predetermined passage of time, the steering control unit 3 waits for the next chance of performing the control functions after completing a series of operations without performing the actions that follow.

On the other hand, when the avoidance steering has not been done even after the predetermined passage of time, the steering control unit 3 issues the operating command to the alarm device 6 so as to have an avoidance steering warning issued (Step 8). Then the steering control unit 3 issues the operating command to the steering motor M1 whereby to have the avoidance steering forcibly done through the operation of the steering motor M1 (Step 9) and terminates a series of operations.

The avoidance steering warning above is intended to inform the driver of steering to be forcibly done for the purpose of evading any danger by preferably giving a voice message, for example, 'Emergency steering is effected now'. In this case, the forcible avoidance steering at Step 9 is such that by using the detected results of the position and speed of the object at Step 2, the forcible steering is directed to any side as determined to be free from obstacles out of both lateral sides of one's own vehicle A and the steering motor M1 is driven by a predetermined quantity in the direction thus determined. Then the forcible steering is returned to the normal steering after the predetermined passage of time.

With the control operation above, the steering angle of the wheels 10 and 10 is increased to one side and held thereto and then returned to the original steering angle in the steering mechanism 1, so that the course of the vehicle is changed to the right or left lane. At this time, switching of lanes from one to another is ensured by changing the driving time of the steering motor M1 and then holding time in accordance with the speed of one's own vehicle A given by the driving condition sensor 4. It is thus possible to promote safety by preventing an object approaching from behind from colliding with one's own vehicle and also preventing side-to-side collision due to the forcible steering.

As the avoidance steering warning is to be issued before the forcible steering is started as described above, there is no fear of causing the driver to be confused by the change of posture due to the forcible steering, whereby the forcible steering can safely be done in order to avoid danger.

A description has been given of an application of the invention to the steer-by-wire type steering system by way of example in this embodiment. However, the invention is applicable to an electric power steering system in which a motor for auxiliary steering based on the detected result of the steering torque applied to a steering wheel and the steering is aided by transmitting the torque of the motor to a steering mechanism and also to a hydraulic power steering system in which a hydraulic cylinder for auxiliary steering is operated by hydraulic fluid supplied via a hydraulic control valve operated in response to the rotation of a steering wheel and the steering is aided by transmitting the generating force of the hydraulic cylinder to a steering mechanism, the motor and the hydraulic cylinder in both systems being subjects of control.

When it is decided at Steps 3 and 4 in the flowchart of FIG. 3 that there is the possibility that the object (mainly another vehicle) approaching from behind may collide with one's own vehicle A, the avoidance warning is issued (Step 5) and the avoidance steering warning is also issued (Step 8). Then the forcible avoidance steering (Step 9) is done by forcibly operating the motor or the hydraulic cylinder as a steering actuator.

In the power steering system, as the steering wheel 2 as a steering unit and the steering mechanism 1 are mechanically coupled together, the steering wheel 2 is rotated by an inverted input from the side of steering mechanism 1 when the forcible avoidance steering is done at Step 9 and this torque may interfere with the force of action applied by the driver who is gripping the steering wheel 2. It is therefore desirable to add a voice message saying, for example, 'Release the handle' to the avoidance steering warning issued at Step 8.

As set forth above in detail, in the vehicle steering system according to the first invention, the results detected by the environmental conditions of the vehicle are utilized for forcing the steering actuator to operate on the basis of the detected results, the evasion of various kinds of dangers brought about during the travel of the vehicle can be realized without increasing the driver's load and this contributes to safety driving.

In the vehicle steering system according to the second invention, useless avoidance steering is prevented by allowing the forcible operation of the steering actuator to be performed on condition that the object is approaching from behind at high speed. Moreover, the direction of the forcible operation is determined on the basis of the detected results of the environment on both sides of the vehicle, so that any danger can be prevented from being newly caused by the forcible steering.

In the vehicle steering system according to the third invention, further, the forcible steering is done after the warning is issued, whereby the danger evasion can be implemented without causing the driver to feel uneasy. Thus the invention can achieve significant results as set forth above in detail.

What is claimed is:

1. A vehicle steering system installed in a vehicle comprising:
   an environmental-condition detecting unit which detects environmental-condition in a rear and on both sides of the vehicle at least;
   a steering actuator which operates in response to an operation of a steering unit for steering and applying steering force to a steering mechanism;
   a decision unit which decides whether an object approaching the vehicle from behind exists and whether the action of steering toward the side of the vehicle can be taken on the basis of the results detected by the environmental-condition detecting unit; and
   a control unit which forces the steering actuator to operate on the basis of the result decided by the decision unit irrespective of the operation of the steering unit.

2. The vehicle steering system according to claim 1, wherein the control unit makes the steering actuator perform a forcible steering operation to one side decided to be appropriate by the decision unit when the decision unit decides that an object is approaching the vehicle from behind at a speed exceeding a predetermined relative speed.

3. The vehicle steering system according to claim 1, further comprising an alarm device for issuing a predetermined warning according to the operating command given by the control unit before the steering actuator performs the forcible steering operation.

4. The vehicle steering system according to claim 3, wherein the control unit decides whether a driver takes an avoidance steering during a predetermined period from when the predetermined warning is issued, and
   wherein when the control unit decides that the driver does not take the avoidance steering during the predetermined time, the control unit forces the steering actuator to operate.

* * * * *